(12) United States Patent
Ishii et al.

(10) Patent No.: US 7,964,155 B2
(45) Date of Patent: Jun. 21, 2011

(54) APPARATUS FOR PRODUCING TRICHLOROSILANE

(75) Inventors: Toshiyuki Ishii, Yokkaichi (JP); Hideo Ito, Kuwana (JP); Yuji Shimizu, Naka-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 300 days.

(21) Appl. No.: 12/226,211

(22) PCT Filed: Oct. 24, 2007

(86) PCT No.: PCT/JP2007/070715
§ 371 (c)(1),
(2), (4) Date: Oct. 10, 2008

(87) PCT Pub. No.: WO2008/053759
PCT Pub. Date: May 8, 2008

(65) Prior Publication Data
US 2009/0155140 A1    Jun. 18, 2009

(30) Foreign Application Priority Data

Oct. 31, 2006  (JP) .................................. 2006-297036
Oct. 3, 2007   (JP) .................................. 2007-259447

(51) Int. Cl.
*B01J 19/00*     (2006.01)
*C01B 33/08*     (2006.01)
*C01B 33/04*     (2006.01)

(52) U.S. Cl. ......... 422/198; 422/241; 423/342; 423/347
(58) Field of Classification Search .................. 422/198, 422/241; 423/342, 347
See application file for complete search history.

(56) References Cited

U.S. PATENT DOCUMENTS

| | | | |
|---|---|---|---|
| 3,653,849 A * | 4/1972 | Bither, Jr. ..................... | 423/299 |
| 4,536,642 A | 8/1985 | Hamster et al. | |
| 4,668,493 A | 5/1987 | Levin | |
| 5,422,088 A * | 6/1995 | Burgie et al. ................ | 423/342 |
| 5,906,799 A | 5/1999 | Burgie et al. | |
| 6,481,207 B2 * | 11/2002 | Miura et al. .................... | 60/670 |
| 2007/0073075 A1 | 3/2007 | Paetzold et al. | |
| 2009/0269259 A1 * | 10/2009 | Ishii et al. ..................... | 422/198 |

FOREIGN PATENT DOCUMENTS

EP    1775263 A1    4/2007

(Continued)

OTHER PUBLICATIONS

International Search Report mailed Jan. 29, 2008, issued on PCT/JP2007/070715.

(Continued)

*Primary Examiner* — Walter D Griffin
*Assistant Examiner* — Natasha Young
(74) *Attorney, Agent, or Firm* — Edwards Angell Palmer & Dodge LLP (57) ABSTRACT

An apparatus for producing trichlorosilane, including: a reaction vessel in which a supply gas containing silicon tetrachloride and hydrogen is supplied to an internal reaction passageway to produce a reaction product gas containing trichlorosilane and hydrogen chloride; a heating mechanism having a heater that heats the interior of the reaction vessel; a gas supply section that supplies the supply gas in the reaction vessel; and a gas discharge section that discharges the reaction product gas from the reaction vessel to the outside, wherein the heater is disposed in the center of the reaction vessel, and the reaction passageway is disposed in the periphery of the heater.

14 Claims, 4 Drawing Sheets

FOREIGN PATENT DOCUMENTS

| | | |
|---|---|---|
| JP | 57-012826 | 1/1982 |
| JP | 57-156318 | 9/1982 |
| JP | 60-122714 | 7/1985 |
| JP | 62-021706 | 1/1987 |
| JP | 62-123011 | 6/1987 |
| JP | 09-157073 | 6/1997 |

OTHER PUBLICATIONS

Supplementary European Search Report dated Jan. 14, 2011, issued for the corresponding European Patent Application No. 07 83 0449.

* cited by examiner

APPARATUS FOR PRODUCING TRICHLOROSILANE

CROSS REFERENCE TO RELATED APPLICATIONS

This application is related to three co-pending applications: "APPARATUS FOR PRODUCING TRICHLOROSILANE" filed even date herewith in the names of Toshiyuki ISHI, Hideo ITO, Yuji SHIMIZU as a national phase entry of PCT/JP2007/070725 filed Oct. 24, 2007; "APPARATUS FOR PRODUCING TRICHLOROSILANE" filed even date herewith in the name of Toshiyuki ISHI, Hideo ITO, Yuji SHIMIZU as a national phase entry of PCT/JP2007/070644 filed Oct. 23, 2007; and "APPARATUS FOR PRODUCING TRICHLOROSILANE" filed even date herewith in the name of Toshiyuki ISHI, Hideo ITO, Yuji SHIMIZU as a national phase entry of PCT/JP2007/070843 filed Oct. 25, 2007; which applications are assigned to the assignee of the present application and all three incorporated by reference herein.

BACKGROUND ART

Trichlorosilane ($SiHCl_3$), which is used as a raw material for the production of highly pure silicon (Si), can be produced by conversion through a reaction of silicon tetrachloride ($SiCl_4$: tetrachlorosilane) with hydrogen.

In other words, silicon is produced by the reductive reaction and the thermolysis reaction of trichlorosilane represented by reaction schemes (1) and (2) shown below, and trichlorosilane is produced by the conversion reaction represented by reaction scheme (3) shown below.

$$SiHCl_3 + H_2 \rightarrow Si + 3HCl \quad (1)$$

$$4SiHCl_3 \rightarrow Si + 3SiCl_4 + 2H_2 \quad (2)$$

$$SiCl_4 + H_2 \rightarrow SiHCl_3 + HCl \quad (3)$$

As an apparatus for producing trichlorosilane, for example, Patent Document 1 (Japanese Patent No. 3,781,439) proposes a reactor in which a reaction chamber surrounded by a heating element is of a dual chamber design having an outer chamber and an inner chamber formed by two concentrically positioned pipes, and a heating element is provided around the outside of the reaction chamber. In this reactor, a gas in the reaction chamber is reacted by heating the reaction chamber from the outside, using heat generated through energization of the heating element which is a heating section formed of carbon and the like.

DISCLOSURE OF THE INVENTION

The following problems remain in the prior art described above.

In the above conventional apparatus for producing trichlorosilane, the interior of the reaction chamber is heated by the heating element provided outside the reaction chamber. In this case, there was a problem that radiant heat was radiated in the radial direction not only inwardly but also outwardly from the heating element, resulting in low thermal efficiency. Also, there was a problem that the heating element was provided so as to cover the periphery of the reaction chamber and thus the size of the entire apparatus increased.

In light of these problems, the present invention has been made and an object thereof is to provide an apparatus for producing trichlorosilane, which enables high thermal efficiency and reduction of the size of the entire apparatus.

The present invention employed the following constitution so as to solve the above problems. Namely, the apparatus for producing trichlorosilane of the present invention includes: a reaction vessel in which a supply gas containing silicon tetrachloride and hydrogen is supplied to an internal reaction passageway to produce a reaction product gas containing trichlorosilane and hydrogen chloride; a heating mechanism having a heater that heats the interior of the reaction vessel; a gas supply section that supplies the supply gas in the reaction vessel; and a gas discharge section that discharges the reaction product gas from the reaction vessel to the outside, wherein the heater is disposed in the center of the reaction vessel, and the reaction passageway is disposed in the periphery of the heater.

In this apparatus for producing trichlorosilane, since the heater is disposed in the center of the reaction vessel and the reaction passageway is disposed in the periphery of the heater, the entire radiant heat radiated in the radial direction outwardly from the heater can be added to the supply gas flowing through the reaction passageway, thus enabling heating with high thermal efficiency. Also, since the heater is stored in the center of the reaction vessel and high heat efficiency is attained, a small-sized heater can be used. Therefore, a large-sized heater, which covers the periphery of the reaction vessel, becomes unnecessary.

In the apparatus for producing trichlorosilane, the gas supply section may be a gas supply pipe and the gas discharge section may be a gas discharge pipe.

The apparatus for producing trichlorosilane may be an apparatus for producing trichlorosilane, wherein the reaction passageway includes: a supply side passageway which is connected to the gas supply section and flows the supply gas toward the center side from the outer circumference side of the reaction vessel; and a discharge side passageway which includes an upstream end connected to the supply side passageway and a downstream end connected to the gas discharge section, and flows the reaction product gas produced from the supply gas toward the outer circumference side from the center side of the reaction vessel; and the supply side passageway is disposed adjoining the discharge side passageway.

In this apparatus for producing trichlorosilane, since the supply side passageway and the discharge side passageway are disposed adjoining each other, the supply gas introduced into the reaction vessel and the produced reaction product gas in a high-temperature state flow adjoining each other, and thus heat exchange between the gases is carried out, and also the supply gas is preheated and the reaction product gas is cooled. Therefore, it is not necessary to separately dispose a heat exchanger outside the reaction vessel and thus the size of the entire apparatus and cost for producing the apparatus can be reduced.

The members that form the reaction vessel of the apparatus for producing trichlorosilane may be formed of carbon.

The surface of the carbon of the apparatus for producing trichlorosilane may be coated with silicon carbide. Since the reaction vessel is formed of carbon coated with silicon carbide (SiC) in this apparatus for producing trichlorosilane, it is possible to set to a higher temperature compared to the case where the reaction vessel is formed of a pure carbon material. Thus, heat exchange with the reaction product gas at a higher temperature can be conducted and thus a high preheating effect can be obtained. Also, the production of impurities such as methane, methylchlorosilane, silicon carbide, and the like by the reaction of carbon with hydrogen, chlorosilane and hydrogen chloride (HCl) in the supply gas and the reaction product gas can be prevented and thus a highly pure trichlorosilane can be obtained.

Furthermore, the apparatus for producing trichlorosilane of the present invention may be provided with a storage container that stores the reaction vessel and the heating mechanism, and may be provided with an argon supply mechanism that supplies argon to the storage container. Since argon is supplied in the storage container by the argon supplying mechanism in this apparatus for producing trichlorosilane, leakage of the supply gas and the reaction product gas from the reaction vessel can be prevented by the periphery of the reaction vessel being in a pressurized state by argon. Thus, it is possible to prevent reaction of the supply gas and the reaction product gas which have leaked from the reaction vessel with carbon used in the heating mechanism and the like outside the reaction vessel.

According to the present invention, the following effects are exerted.

According to the apparatus for producing trichlorosilane, since the heater is disposed in the center of the reaction vessel and the reaction passageway is disposed in the periphery of the heater, it is possible to heat with high thermal efficiency. Also, since a small-sized heater can be used, a large-sized heater, which covers the periphery of the reaction vessel, becomes unnecessary. Therefore, an electric power required to heating can be reduced and also the size of the entire apparatus can be reduced.

BEST MODE FOR CARRYING OUT THE INVENTION

An embodiment of the apparatus for producing trichlorosilane of the present invention will be described below with reference to FIG. 1.

Figure 1:
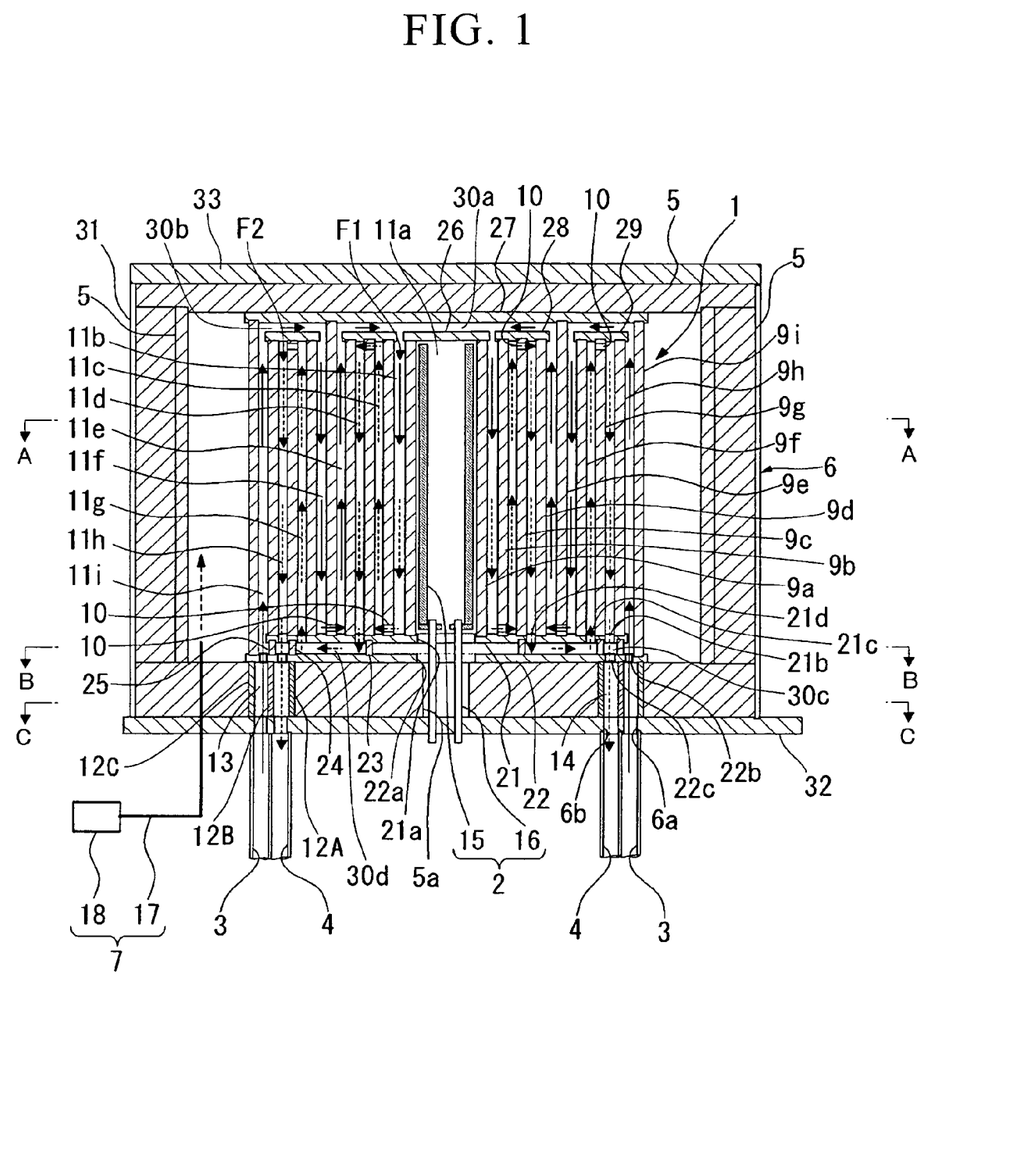
FIG. 1 is a schematic sectional view showing an embodiment of an apparatus for producing trichlorosilane of the present invention.

As shown in FIG. 1, the apparatus for producing trichlorosilane of the present embodiment includes a reaction vessel 1 in which a supply gas containing silicon tetrachloride and hydrogen is supplied to an internal reaction passageway to produce a reaction product gas containing trichlorosilane and hydrogen chloride by conversion reaction; a heating mechanism 2 for heating the reaction vessel 1 from the inside; a plurality of gas supply pipes 3 for supplying the supply gas in the reaction vessel 1; a plurality of gas discharge pipes 4 for discharging the reaction product gas from the reaction vessel 1 to the outside; a heat insulating material 5 disposed so as to cover the periphery of the reaction vessel 1 and the heating mechanism 2; a storage container 6 for storing the reaction vessel 1, the heating mechanism 2 and the heat insulating material 5; and an argon supplying mechanism 7 for supplying argon (Ar) in the storage container 6.

Figure 2:
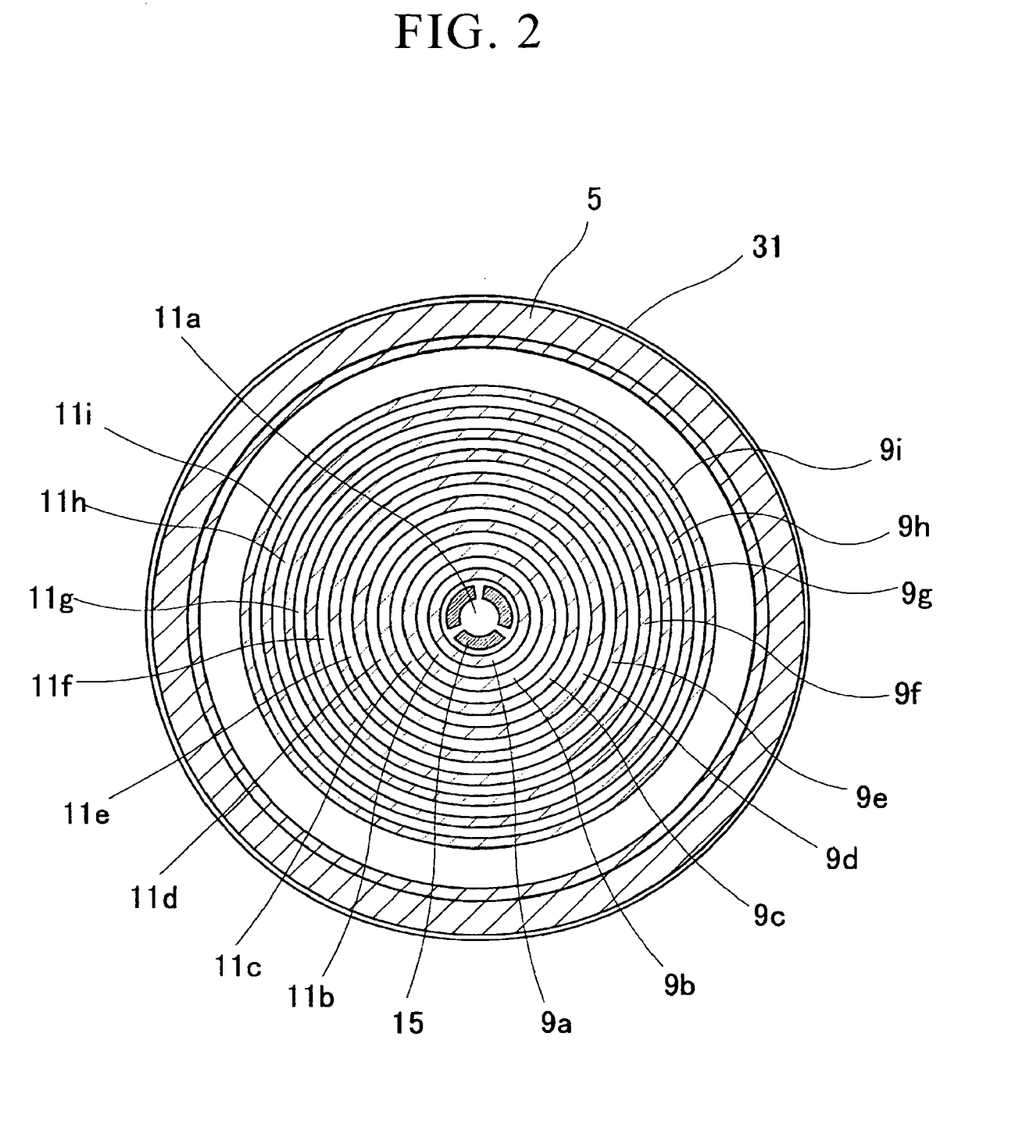
FIG. 2 is a sectional view taken along lines A-A in FIG. 1.
Figure 3:
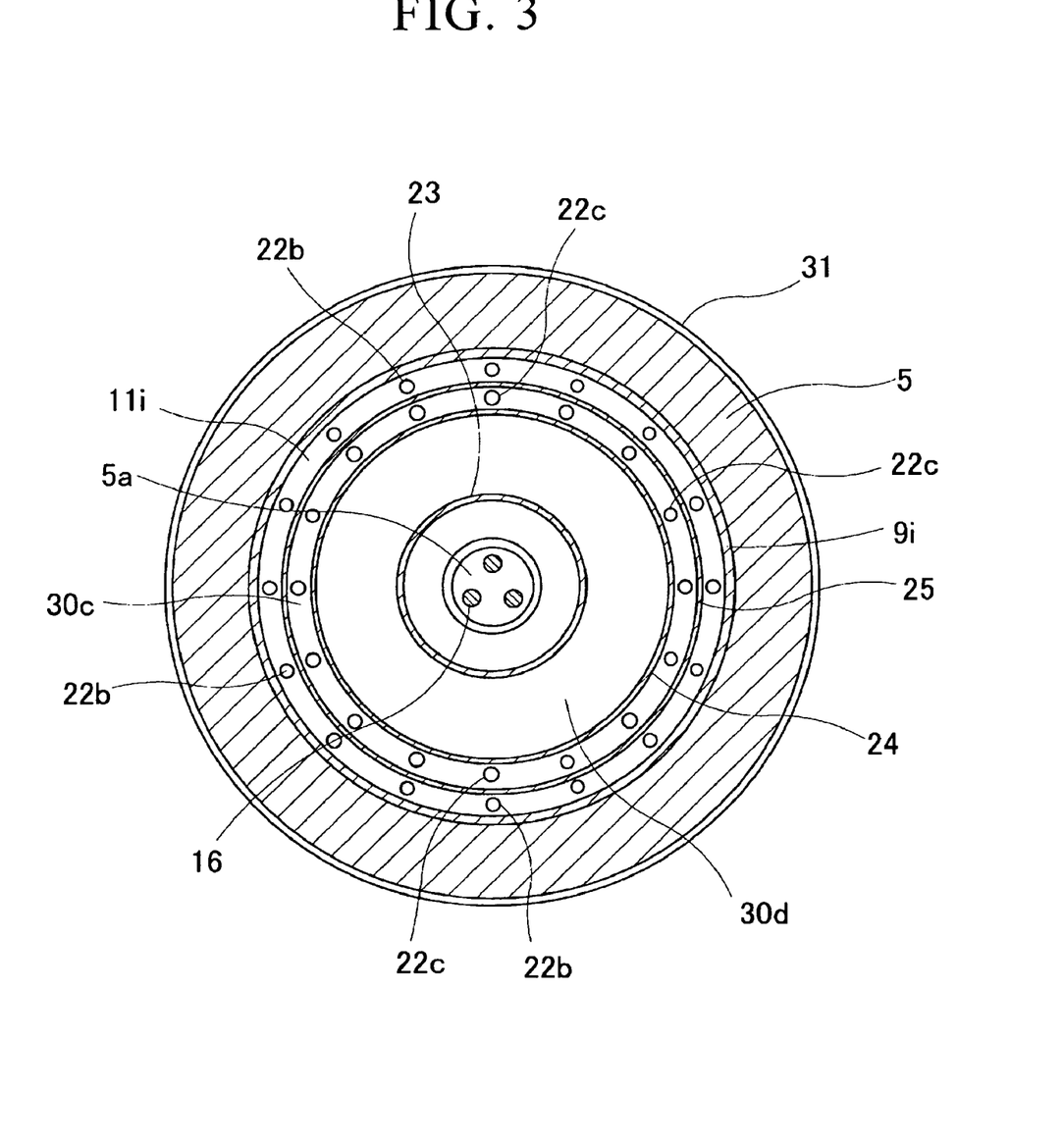
FIG. 3 is a sectional view taken along lines B-B in FIG. 1.

The reaction passageway in the reaction vessel 1 includes a supply side passageway F1 which is connected to the gas supply pipe 3 and flows the supply gas toward the center side from the outer circumference side of the reaction vessel 1 while meandering (zigzagging) up and down, and a discharge side passageway F2 which includes an upstream end connected to the supply side passageway F1 and a downstream end connected to the gas discharge pipe 4, and flows the reaction product gas toward the outer circumference side from the center side of the reaction vessel 1 while meandering up and down. The supply side passageway F1 and the discharge side passageway F2 are disposed adjoining each other As shown in FIGS. 1 and 2, in order to form the reaction passageways F1 and F2, the reaction vessel 1 is provided with cylindrical first to ninth reaction tubular walls 9a to 9i which have different inner diameters and are concentrically disposed in order from the inside; a first lower circular plate 21 for supporting the bottoms of the first to eighth tubular walls 9a to 9h; a second lower circular plate 22 for supporting the bottom of the ninth reaction tubular wall 9i; first to third tubular spacer members 23 to 25 (see FIG. 3) for supporting the first lower circular plate 21 on the second lower circular plate 22, which have the same diameter and center as the third, seventh and eighth reaction tubular walls 9c, 9g and 9h respectively; a first upper circular plate 26 for closing the upper opening of the first reaction tubular wall 9a; a second upper circular plate 27 fixed on the tops of the fifth reaction tubular wall 9e and the ninth reaction tubular wall 9i; a first annular plate 28 fixed on the tops of the second to fourth reaction tubular walls 9b to 9d; and a second annular plate 29 fixed on the tops of the sixth to eighth reaction tubular walls 9f to 9h.

The first to ninth reaction tubular walls 9a to 9i partition a majority of the internal space of the reaction vessel 1 into a central columnar space 11a and a plurality of tubular spaces 11b to 11i in the periphery thereof.

An outer diameter decreases in the order of the second upper circular plate 27, the second annular plate 29, the first annular plate 28 and the first upper circular plate 26. The second annular plate 29, the first annular plate 28 and the first upper circular plate 26 are provided with a predetermined vertical distance from the second upper circular plate 27. The fifth reaction tubular wall 9e and the ninth reaction tubular wall 9i are set to be higher compared to other reaction tubular walls.

The first lower circular plate 21 has a diameter smaller than the second lower circular plate 22 and is provided above the second lower circular plate 22 with a predetermined space therebetween interposing the first to third tubular spacer members 23 to 25.

There is a predetermined space provided between the first upper circular plate 26 and the first annular plate 28, between the first annular plate 28 and the fifth reaction tubular wall 9e, between the fifth reaction tubular wall 9e and the second annular plate 29, and between the second annular plate 29 and the ninth reaction tubular wall 9i, respectively. With such constitution, a horizontal space between a lower surface of the second upper circular plate 27 and upper surfaces of the second annular plate 29, the first annular plate 28 and the first upper circular plate 26 is partitioned into a flat circular small space 30a inside the fifth reaction tubular wall 9e and a ring-shaped small space 30b between the fifth reaction tubular wall 9e and the ninth reaction tubular wall 9i. The flat circular small space 30a is in communication with a cylindrical small space 11b between the first reaction tubular wall 9a and the second reaction tubular wall 9b and a cylindrical small space 11e between the fourth reaction tubular wall 9d and the fifth reaction tubular wall 9e, while the ring-shaped small space 30b is in communication with a small space 11f between the fifth reaction tubular wall 9e and the sixth reaction tubular wall 9f and a small space 11i between the eighth reaction tubular wall 9h and the ninth reaction tubular wall 9i.

A plurality of first through-holes 21b are formed in the circumferential direction on the circumferential edge portion, a plurality of second through-holes 21c in the circumferential direction more inside than these first through-holes 21b, and a plurality of third through-holes 21d in the circumferential direction more inside than these second through-holes 21c are formed in the first lower circular plate 21. Also, a plurality of fourth through-holes 22b are formed in the circumferential direction on the circumferential edge portion and a plurality of fifth through-holes 22c are formed in the circumferential direction more inside than the fourth through-holes 22b in the second lower circular plate 22.

The first through-holes 21b are opened in the small space 11h between the seventh reaction tubular wall 9g and the eighth reaction tubular wall 9h and the second through-holes 21c are opened in the small space 11g between the sixth reaction tubular wall 9f and the seventh reaction tubular wall 9g. Also, the third through-holes 21d are opened in the small space 11d between the third reaction tubular wall 9c and the fourth reaction tubular wall 9d. With such constitution, a space between the first lower circular plate 21 and the second lower circular plate 22 is partitioned by the first to third tubular spacer members 23 to 25 into a plurality of spaces to form a small space 30c which is in communication with the first through-holes 21b, and a small space 30d which is in communication with the second through-holes 21c and the third through-holes 21d.

A plurality of flow through-holes 10 are formed in the circumferential direction in lower portions of the second reaction tubular wall 9b and the fifth reaction tubular wall 9e. Also, a plurality of flow through-holes 10 are formed in the circumferential direction in upper portions of the third reaction tubular wall 9c and the seventh reaction tubular wall 9g.

Figure 4:
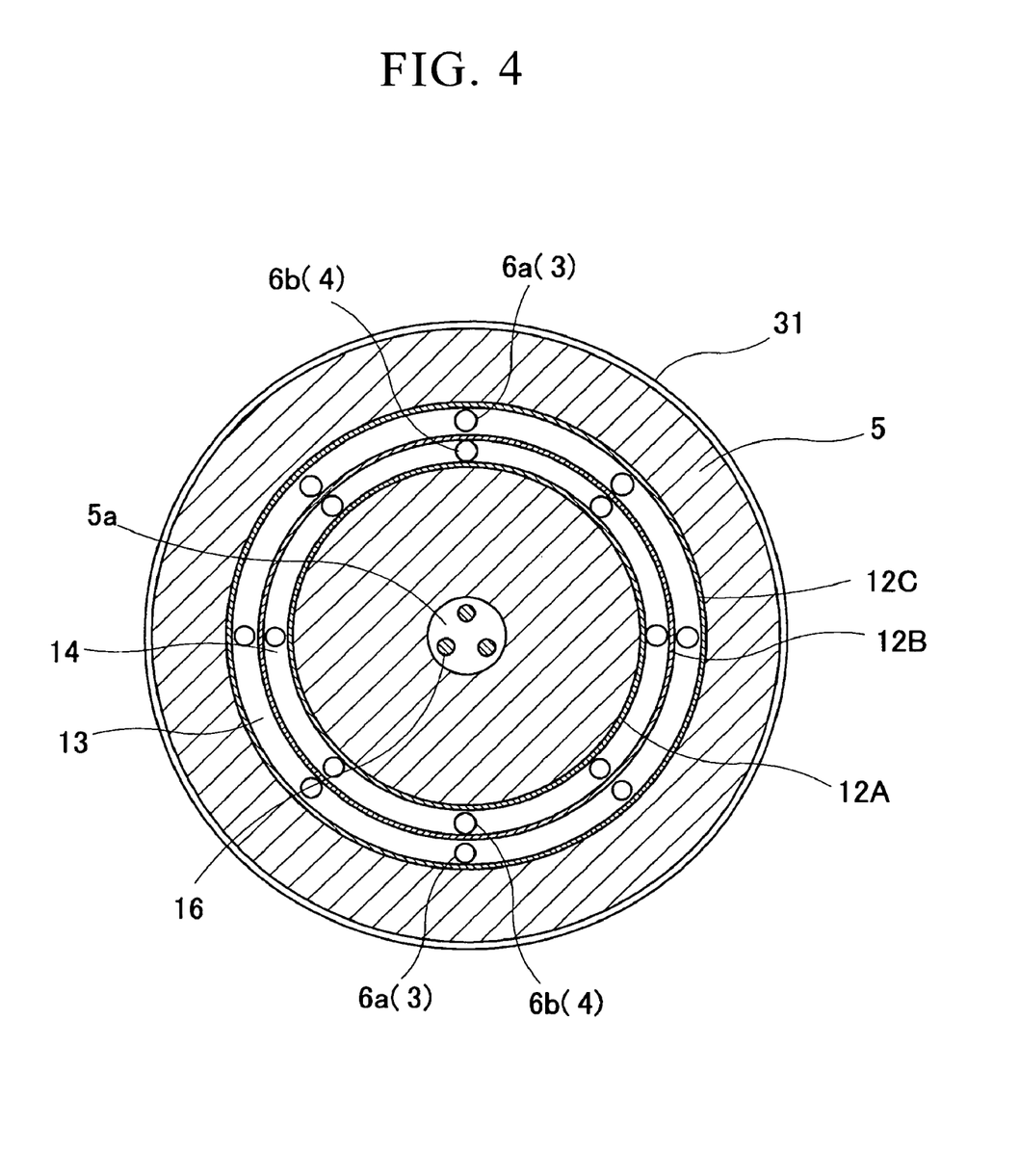
FIG. 4 is a sectional view taken along lines C-C in FIG. 1.

The gas supply pipe 3 and gas discharge pipe 4 are in communication with a supply hole 6a and a discharge hole 6b formed in the bottom of the storage container 6 respectively, while the top ends thereof are fixed to the bottom of the storage container 6. In the bottom of the storage container 6, as shown in FIGS. 1 and 4, triple tubular bodies 12A to 12C, which have different inner diameters and which are concentrically disposed, penetrate the heat insulating material 5. Between an inner tubular body 12A and an intermediate tubular body 12B is formed a tubular supply connection passageway 13, and between the intermediate tubular body 12B and an outer tubular body 12C is formed a tubular discharge connection passageway 14. Also, the upper end openings of the supply hole 6a and the discharge hole 6b are in communication with the lower end openings of the supply connection passageway 13 and the discharge connection passageway 14 respectively.

The tubular bodies 12A to 12C, which form the supply connection passageway 13 and the discharge connection passageway 14, and the heat insulating material 5 in the lower portion of the storage container 6 support the lower surface of the second lower circular plate 22 at the upper portion. The upper opening of the supply connection passageway 13 is in communication with the fourth through-holes 22b and also the upper opening of the discharge connection passageway 14 is in communication with the fifth through-holes 22c.

A plurality of the gas supply pipes 3 and a plurality of the gas discharge pipes 4 are disposed at intervals in the circumferential direction of the supply connection passageway 13 and the discharge connection passageway 14. A supply source (not shown) of the supply gas is connected to the gas supply pipes 3. Although the reaction product gas is discharged from the gas discharge pipe 4 to the outside by the pressure gradient in the pipe, a discharge pump may be connected to the gas discharge pipe 4.

The heating mechanism 2 is provided with a heater 15, which is a heating element disposed in the center of the reaction vessel 1 and with an electrode section 16 which is connected to the bottom of the heater 15 penetrating the lower portion of the storage container for flowing an electric current to the heater 15. Namely, the heater 15 is stored in the first reaction tubular wall 9a and the above reaction passageway is disposed in the periphery of the heater 15.

The first lower circular plate 21 and the second lower circular plate 22 are formed with the first central hole 21a and the second central hole 22a, and also the heat insulating material 5 at the lower portion of the storage container 6 is formed with the third central hole 5a. The electrode section 16 is inserted via the first central hole 21a, the second central hole 22a and the third central hole 5a.

The heater 15 is formed of carbon. The electrode section 16 is connected to a power supply (not shown).

The heating mechanism 2 carries out heating control so that the temperature inside the reaction vessel 1 becomes a temperature in the range from 800 to 1,400° C. If the temperature inside the reaction vessel 1 is set to 1,200° C. or higher, the conversion ratio is improved. Also, disilanes may be introduced to recover silanes.

With respect to each of the members forming the reaction vessel 1, in this embodiment, the first to ninth reaction tubular walls 9a to 9i, the first lower circular plate 21, the second lower circular plate 22, the first to third tubular spacer members 23 to 25, the first upper circular plate 26, the second upper circular plate 27, the first annular plate 28, the second annular plate 29, and the like are formed of carbon and the surface of the carbon is coated with silicon carbide.

The storage container 6 is constituted of a tubular wall 31, and a bottom plate 32 and a ceiling plate 33 which block both ends thereof, and is made of stainless steel.

The heat insulating material 5 is formed of, for example, carbon, and is fixed to the inner wall surface of the tubular wall 31, the upper surface of the bottom plate 32, and the lower surface of the ceiling plate 33 of the storage container 6 so as to be pasted inside the storage container 6.

A temperature sensor (not shown) which protrudes into the reaction passageways F1 and F2 (for example, small space 11b) is fixed to the lower surface of the second upper circular plate 27. The temperature is controlled by the heating mechanism 2 while the temperature is measured by this temperature sensor.

The argon supply mechanism 7 is provided with an argon supply pipe 17, the tip end thereof protruding into the storage container 6 by penetrating the bottom of the storage container 6 and the heat insulating material 5, and with an argon supply source 18 which is connected to the argon supply pipe 17. This argon supply mechanism 7 carries out argon supply control so that interior of the storage container 6 becomes a predetermined pressurized state. A container pump (not shown) for carrying out replacement of the inside atmosphere or argon exhaustion is connected to the top of the storage container 6.

The flow of the gas in the apparatus for producing trichlorosilane of the present embodiment will be described below with reference to the drawing.

First, a supply gas introduced from the gas supply pipe 3 via the supply connection passageway 13 flows in an upper direction in the outermost small space 11i between the eighth reaction tubular wall 9h and the ninth reaction tubular wall 9i, moves to the inside via the horizontal small space 30b between the second upper circular plate 27 and the second annular plate 29, and flows in a downward direction in the small space 11f between the fifth reaction tubular wall 9e and the sixth reaction tubular wall 9f. Next, the supply gas moves to the small space 11e between the fourth reaction tubular wall 9d and the fifth reaction wall 9e via the flow through-holes 10 of the fifth reaction tubular wall 9e and flows in an upward direction. Furthermore, the supply gas moves to the inside via the horizontal small space 30a between the second upper circular plate 27 and the first annular plate 28, and flows in a downward direction in the small space 11b between the first reaction tubular wall 9a as the innermost side and the second reaction tubular wall 9b. In other words, the above-described passageways of the supply gas constitute the supply side passageway F1. The supply gas is converted into a reaction product gas by heating as it approaches the heater 15 of the center portion.

Therefore, it is set so that the supply gas supplied to the small space 11i on the outermost side of the supply side passageway F1, while being heated, becomes a reaction product gas by reaction while sequentially changing flowing direction upwardly and downwardly in the inside space via the flow through-holes 10, and the like. In the drawing, the flow direction of the gas is indicated by arrow.

Next, the produced reaction product gas moves to the outside from the small space 11b between the first reaction tubular wall 9a and the second reaction tubular wall 9b via the flow through-holes 10 of the second reaction tubular wall 9b, and flows in an upward direction in the small space 11c between the second reaction tubular wall 9b and the third reaction tubular wall 9c. Furthermore, the reaction product gas moves to the outside via the flow through-holes 10 of the third reaction tubular wall 9c, and flows in an downward direction in the small space 11d between the third reaction tubular wall 9c and the fourth reaction tubular wall 9d.

Next, the reaction product gas moves to the small space 30d between the first lower circular plate 21 and the second lower circular plate 22 via the third through-holes 21d of the first lower circular plate 21, and flows to the outside. Then, the reaction product gas flows in an upward direction in the small space 11g between the sixth reaction tubular wall 9f and the seventh reaction tubular wall 9g via the second through-holes 21c of the first lower circular plate 21, and flows in a downward direction in the small space 11h between the seventh reaction tubular wall 9g and the eighth reaction tubular wall 9h via the flow through-holes 10 of the seventh reaction tubular wall 9g. In other words, the above-described passageways from the inside to the outside of the reaction vessel 1 constitute the discharge side passageway F2. As described above, the discharge side passageway F2 and the supply side passageway F1 are set so that the gas flows in these passageways adjoining each other while repetitively changing the flow direction to the up direction and to the down direction.

After this, the reaction product gas is discharged to the outside from a plurality of gas discharge pipes 4 via the first through-hole 21b in the first lower circular plate 21, the small space 30c between the first tubular spacer member 23 and the second tubular spacer member 24, the fifth through-hole 22c in the second lower circular plate 22, the discharge connection passageway 14, and the exhaust hole 6b in order.

Thus, in the present embodiment, since the heater 15 is disposed in the center of the reaction vessel 1 and the reaction passageways F1 and F2 are disposed in the periphery of the heater 15, the entire radiant heat radiated in the radial direction outwardly from the heater 15 can be added to the supply gas flowing through the reaction passageway F1 and F2, thus enabling heating with high thermal efficiency. Also, since the heater 15 is stored in the center of the reaction vessel 1 and high heat efficiency can be attained, a small-sized heater 15 can be used. Therefore, a large-sized heater, which covers the periphery of the reaction vessel, becomes unnecessary. As described above, by heating from the center of the reaction vessel 1, heat radiation loss to the outside of the reaction vessel 1 is small and heat insulating performance of the heat insulating material 5 surrounding the reaction vessel 1 can be small. For example, it becomes possible to use a thin heat insulating material and cost can be reduced.

Since the supply side passageway F1 and the discharge side passageway F2 are disposed adjoining each other, heat exchange of the supply gas introduced into the reaction vessel 1 with the produced reaction product gas in a high-temperature state is conducted by flowing the gases adjoining each other, and thus the supply gas is preheated and the reaction product gas is cooled. Therefore, it is not necessary to separately dispose a heat exchanger outside the reaction vessel 1 and the supply gas can be efficiently preheated. Also, since a heat exchange mechanism is disposed in the reaction vessel 1, the size of the entire apparatus and the cost for producing the apparatus can be reduced.

Furthermore, since the reaction vessel 1 is formed of carbon coated with silicon carbide (SiC), it is possible to set to a higher temperature compared to the case where the reaction vessel is formed of a pure carbon material. Thus, heat exchange with a higher temperature reaction product gas can be conducted and thus a high preheating effect can be obtained. Also, the production of impurities such as methane, methylchlorosilane, silicon carbide, and the like by the reaction of carbon with hydrogen, chlorosilane and hydrogen chloride (HCl) in the supply gas and the reaction product gas can be prevented and thus a highly pure trichlorosilane can be obtained.

Thermal expansion of each of the reaction tubular walls 9a to 9i occurs by heating from the heating mechanism 2. In this case, there is a tendency for the inside reaction tubular wall 9a to have the largest thermal expansion by being the most heated since the heating mechanism 2 is disposed inside. However, since the reaction product gas that has become a high temperature flows adjoining the supply side passageway F1 in the discharge side passageway F2 and there is heat exchange between the gases flowing in both passageways F1 and F2, it is possible to reduce the temperature difference in the radial direction and thus it is possible to reduce the heat strain which occurs in the constitutional members of the reaction vessel 1 (in particular, upper circular plates 26 and 27, annular plates 28 and 29, and lower circular plates 21 and 22 disposed in a radial direction).

In the example shown in FIG. 1, the second upper circular plate 27 and the second lower circular plate 22, are in a state of contacting the heat insulating material 5. Thus, the thermal expansion force of the reaction tubular walls directly acts on the heat insulating material 5. This heat insulating material 5 is that which has cushionability that can absorb this thermal expansion. Also, considering the thermal expansion allowance of the reaction tubular walls, a space may be disposed between the heat insulating material 5 and the second upper circular plate 27.

The heating mechanism 2 may be constituted such that, in addition to the inside heater 15, a small capacity heater is disposed outside the reaction vessel 1 for preliminarily heating the supply gas introduced into the outside small space 11i. By disposing the outside heater, occurrence of heat strain can be suppressed by further reducing the temperature difference in the radial direction.

Also, since argon is supplied to the storage container 6 by the argon supplying mechanism 7, leakage of the supply gas and the reaction product gas from the reaction vessel 1 can be prevented by the periphery of the reaction vessel being in a pressurized state by argon. Thus, it is possible to prevent reaction of the supply gas and the reaction product gas which have leaked from the reaction vessel 1 with carbon used in the heating mechanism 2 and the like outside the reaction vessel 1.

When argon is supplied as a purge gas, since argon is supplied from the bottom of the storage container 6 by the argon supply mechanism 7, natural convection occurs in an upward direction by heating with the heater 15. Also, by suction from a container pump connected to the top of the storage container 6, a high purge effect can be obtained by the purge gas flowing out smoothly from the bottom to the top.

The technical scope of the present invention is not limited to the above embodiments and various modifications which do not depart from the spirit of the present invention can be added.

For example, in the above embodiments, the position of the gas supply pipe 3 and the gas discharge pipe 4 may be disposed oppositely, and the gas flow may be opposite by making the entrance and the exit of the gas opposite in a similar apparatus structure.

While nine first to ninth reaction tubular walls 9a to 9i were used in the above embodiments, a number of reaction tubular walls other than nine may be used. When the number of reaction tubular walls is large, whereas the energy efficiency increases because of the increased heat transfer area, the heating efficiency decreases since it becomes difficult to transfer the radiant heat by the heating mechanism 2. Thus, an appropriate number of reaction tubular walls are disposed according to gas flow amount and the size of the entire apparatus.

Also, a cooling mechanism may be added by forming a refrigerant passageway for the flowing of a refrigerant such as water inside the wall of the storage container 5.

Furthermore, the flow through-holes 10 in both reaction tubular walls which form cylindrical surfaces between the walls, may be formed in not only up and down positions but in the circumferential direction so as to be dislocated with each other. In this situation, the passageway between the flow through-holes 10 can be made longer. Also, they do not have to be through-holes and may be flow penetration sections by notches formed in the upper end section or the lower end section of the reaction tubular walls.

INDUSTRIAL APPLICABILITY

According to the apparatus for producing trichlorosilane of the present invention, the heater is disposed in the center of the reaction vessel and the reaction passageway is disposed in the periphery of the heater, thus enabling heating with high thermal efficiency. Also, since a small-sized heater can be used, a large-sized heater, which covers the periphery of the reaction vessel, becomes unnecessary. Therefore, an electric power required to heating can be reduced and also the size of the entire apparatus can be reduced.

The invention claimed is:

1. An apparatus for producing trichlorosilane, comprising:
a reaction vessel in which a supply gas containing silicon tetrachloride and hydrogen is supplied to an internal reaction passageway, with an open space from a supply hole to a discharge hole and having a plurality of walls, to produce a reaction product gas containing trichlorosilane and hydrogen chloride;
a heating mechanism having a heater that heats the interior of the reaction vessel;
a gas supply section that supplies the supply gas in the reaction vessel; and
a gas discharge section that discharges the reaction product gas from the reaction vessel to the outside, wherein
the heater is disposed in the center of the reaction vessel, and
the reaction passageway is disposed in the periphery of the heater.

2. The apparatus for producing trichlorosilane according to claim 1, wherein the reaction passageway includes:
a supply side passageway which is connected to the gas supply section and flows the supply gas toward the center side from the outer circumference side of the reaction vessel; and
a discharge side passageway that includes an upstream end connected to the supply side passageway and a downstream end connected to the gas discharge section, and flows the reaction product gas produced from the supply gas toward the outer circumference side from the center side of the reaction vessel, and
the supply side passageway and the discharge side passageway are disposed adjoining each other.

3. The apparatus for producing trichlorosilane according to claim 1, wherein a member forming the reaction vessel is formed of carbon.

4. The apparatus for producing trichlorosilane according to claim 3, wherein a surface of the carbon is coated with silicon carbide.

5. The apparatus for producing trichlorosilane according to claim 1, comprising:
a storage container that stores the reaction vessel and the heating mechanism, and
an argon supply mechanism that supplies argon in the storage container.

6. The apparatus for producing trichlorosilane according to claim 3, comprising:
a storage container for storing the reaction vessel and the heating mechanism, and
an argon supply mechanism for supplying argon in the storage container.

7. The apparatus for producing trichlorosilane according to claim 4, comprising:
a storage container that stores the reaction vessel and the heating mechanism, and
an argon supply mechanism that supplies argon in the storage container.

8. The apparatus for producing trichlorosilane according to claim 2, wherein a member forming the reaction vessel is formed of carbon.

9. The apparatus for producing trichlorosilane according to claim 8, wherein a surface of the carbon is coated with silicon carbide.

10. The apparatus for producing trichlorosilane according to claim 2, comprising:
a storage container that stores the reaction vessel and the heating mechanism, and
an argon supply mechanism that supplies argon in the storage container.

11. The apparatus for producing trichlorosilane according to claim 8, comprising:
a storage container for storing the reaction vessel and the heating mechanism, and
an argon supply mechanism for supplying argon in the storage container.

12. The apparatus for producing trichlorosilane according to claim 9, comprising:
a storage container that stores the reaction vessel and the heating mechanism, and an argon supply mechanism that supplies argon in the storage container.

13. The apparatus for producing trichlorosilane according to claim 1, wherein the reaction passageway has a plurality of reaction tubular walls.

14. The apparatus for producing trichlorosilane according to claim 1, wherein the heating mechanism has an electrode section that flows electric current to the heater.

* * * * *